(12) United States Patent
Xu et al.

(10) Patent No.: US 12,142,732 B2
(45) Date of Patent: Nov. 12, 2024

(54) BATTERY CELL AND ELECTROCHEMICAL DEVICE INCLUDING SAME

(71) Applicant: NINGDE AMPEREX TECHNOLOGY LIMITED, Ningde (CN)

(72) Inventors: Yan Xu, Ningde (CN); Rui Li, Ningde (CN); Xuchen Lian, Ningde (CN); Xingguo Jiang, Ningde (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 120 days.

(21) Appl. No.: 17/958,125

(22) Filed: Sep. 30, 2022

(65) Prior Publication Data

US 2023/0043958 A1 Feb. 9, 2023

Related U.S. Application Data

(63) Continuation of application No. PCT/CN2020/082256, filed on Mar. 31, 2020.

(51) Int. Cl.
*H01M 10/0585* (2010.01)
(52) U.S. Cl.
CPC ............................... *H01M 10/0585* (2013.01)
(58) Field of Classification Search
CPC ............. H01M 10/0585; H01M 10/04; H01M 10/0436; H01M 10/0463; H01M 50/103;
(Continued)

(56) References Cited

U.S. PATENT DOCUMENTS

2003/0049527 A1* 3/2003 Yageta ................. H01M 50/553
429/129
2003/0124422 A1* 7/2003 Cintra .................... H01M 4/139
429/232
(Continued)

FOREIGN PATENT DOCUMENTS

CN           2768215 Y      3/2006
CN         201985201 U      9/2011
(Continued)

OTHER PUBLICATIONS

Ningde Amperex Technology Ltd., PCT/CN2020/082256, International Search Report and Written Opinion, Dec. 28, 2020, 15 pgs.
(Continued)

*Primary Examiner* — Andrew Sasinowski
(74) *Attorney, Agent, or Firm* — Morgan, Lewis & Bockius LLP

(57) ABSTRACT

A battery cell, comprising a first electrode plate, an separator and a second electrode plate, the first electrode plate, the separator and the second electrode plate are stacked in sequence along a first direction, the battery cell also includes a first side surface and a second side surface which are disposed along the first direction and adjacent to each other, the first side surface and the second side surface are connected through a first connection region, the battery cell further includes an adhesive film, and the adhesive film is disposed in the first connection region, and is bonded to the first electrode plate, the separator and the second electrode plate, thereby improving safety of the battery cell.

18 Claims, 6 Drawing Sheets

(58) Field of Classification Search
CPC .... H01M 50/14; H01M 50/20; H01M 50/461; H01M 50/102; H01M 10/0525; H01M 50/409; Y02E 60/10; Y02P 70/50
See application file for complete search history.

(56) References Cited

U.S. PATENT DOCUMENTS

| | | | |
|---|---|---|---|
| 2004/0197643 A1* | 10/2004 | Buckle | H01M 50/167 29/623.2 |
| 2004/0197645 A1* | 10/2004 | Buckle | H01M 4/364 429/174 |
| 2008/0003492 A1* | 1/2008 | Bates | H01M 10/0525 429/185 |
| 2011/0003198 A1 | 1/2011 | Noda et al. | |
| 2012/0135285 A1 | 5/2012 | Iwama et al. | |
| 2015/0007864 A1* | 1/2015 | Chiu | H01L 31/1892 156/276 |
| 2015/0136301 A1* | 5/2015 | Cyman, Jr. | H01B 3/306 524/517 |
| 2015/0188185 A1 | 7/2015 | Taylor et al. | |
| 2017/0170524 A1* | 6/2017 | Zhu | H01M 10/052 |
| 2018/0083311 A1 | 3/2018 | Kim et al. | |
| 2019/0165339 A1* | 5/2019 | Jiang | H01M 50/122 |

FOREIGN PATENT DOCUMENTS

| | | |
|---|---|---|
| CN | 202395109 U | 8/2012 |
| CN | 105355962 A | 2/2016 |
| CN | 105514352 A | 4/2016 |
| CN | 207602628 U | 7/2018 |
| CN | 109860713 A | 6/2019 |
| CN | 110137415 A | 8/2019 |
| CN | 209544535 U | 10/2019 |
| EP | 3340358 A1 | 6/2018 |
| EP | 2985807 B1 | 8/2018 |
| JP | 2014209415 | 11/2014 |
| JP | 2018-526798 | 9/2018 |
| JP | 2020-030899 | 2/2020 |
| KR | 20150072016 A | 6/2015 |
| KR | 20170002140 A | 1/2017 |
| KR | 20190055994 A | 5/2019 |
| WO | WO2021/195909 A1 | 10/2021 |

OTHER PUBLICATIONS

Ningde Amperex Technology Ltd., Extended European Search Report, EP20928678.0, Jun. 28, 2023, 5 pgs.
Ningde Amperex Technology Ltd., First Office Action, CN202080035805.3, Mar. 22, 2023, 6 pgs.
Ningde Amperex Technology Ltd., Second Office Action, CN202080035805.3, Jul. 6, 2023, 5 pgs.
Ningde Amperex Technology Ltd., Examination Report, IN202217061693, Jan. 24, 2023, 6 pgs.
Ningde Amperex Technology Ltd., Office Action, JP2022557201, Oct. 24, 2023, 3 pgs.

* cited by examiner

BATTERY CELL AND ELECTROCHEMICAL DEVICE INCLUDING SAME

CROSS REFERENCE TO THE RELATED APPLICATIONS

This application is a continuation application of PCT Patent Application No. PCT/CN2020/082256, entitled "BATTERY CORE AND ELECTROCHEMICAL DEVICE APPLYING SAME" filed on Mar. 31, 2020, which is incorporated herein by reference in its entirety.

TECHNICAL FIELD

The present application relates to the field of batteries, and in particular, to a battery cell and an electrochemical device applying the battery cell.

BACKGROUND

Batteries have been widely used in various electronic products due to the advantages such as high energy density, high working voltage, long cycle life, environmental protection and safety. Therefore, the requirements for safety of the batteries are increasingly high. The joint between two adjacent edges in a battery cell is relatively sharp, and is prone to damage an encapsulation film (aluminum-plastic film) encapsulating the battery cell when subjected to an external force, which further leads to corrosion of the battery and affects the safety of the battery.

SUMMARY

In view of the above situation, it is necessary to provide a battery cell favorable to improve the safety.

In addition, it is further necessary to provide an electrochemical device applying the above battery cell.

The battery cell according to the present application includes a first electrode plate, an separator and a second electrode plate which are stacked in sequence along a first direction, the battery cell further includes a first side surface and a second side surface which are extending along the first direction and are adjacent to each other, the first side surface and the second side surface are connected by a first connection region, the battery cell further includes an adhesive film, and the adhesive film is disposed in the first connection region, and is used for bonding the first electrode plate, the separator and the second electrode plate.

As a solution of the present application, the adhesive film is an adhesive layer or adhesive tape.

As a solution of the present application, each of the first electrode plate and the second electrode plate includes a first edge corresponding to the first side surface, a second edge corresponding to the second side surface, and a first connection position corresponding to the first connection region, wherein each first connection position includes a chamfered angle or a rounded angle, so that the first connection region correspondingly forms a chamfered angle region or a rounded angle region, and the adhesive film is disposed in the chamfered angle region or the rounded angle region to bond the first electrode plate, the separator and the second electrode plate.

As a solution of the present application, when each first connection position includes a chamfered angle, the first connection position further includes a first rounded angle connected to the chamfered angle, a first end of the chamfered angle deviated from the first rounded angle is connected to the first edge, and a second end of the first rounded angle deviated from the chamfered angle is connected to the second edge.

As a solution of the present application, the first connection position further includes a second rounded angle, and the second rounded angle is connected to the first edge and one end of the chamfered angle deviated from the first rounded angle.

As a solution of the present application, a size of the first rounded angle is the same as or different from a size of the second rounded angle.

As a solution of the present application, the battery cell further includes a third side surface and a fourth side surface which are extending along the first direction and are adjacent to each other, the third side surface and the fourth side surface are connected by a second connection region, each of the first electrode plate and the second electrode plate includes a third edge corresponding to the third side surface, a fourth edge corresponding to the fourth side surface, and a second connection position corresponding to the second connection region, wherein each second connection position includes a chamfered angle or a rounded angle, and the adhesive film is also disposed in a chamfered angle region or a rounded angle region formed in the second connection region corresponding to the second connection position to bond the first electrode plate, the separator and the second electrode plate.

As a solution of the present application, along a second direction perpendicular to a tangential direction of the first connection region, a thickness of a thickest part of the adhesive film is 20 microns to 100 microns.

As a solution of the present application, the adhesive film further extends from the first connection region to the first side surface or the second side surface, and the adhesive film extends from the first connection region to the first side surface or the second side surface with a width less than or equal to 5 mm.

As a solution of the present application, the battery cell further includes a first surface and a second surface which are perpendicular to the first direction and opposite to each other, the adhesive film also extends from the first connection region to the first surface or the second surface, and the adhesive film extends from the first connection region to the first surface or the second surface with a width less than or equal to 2 mm.

As a solution of the present application, the adhesive film has viscosity at a temperature from normal temperature to 75° C.

The electrochemical device according to the present application includes a housing and the battery cell as mentioned above, the battery cell being disposed in the housing.

According to the battery cell and the electrochemical device applying the battery cell of the present application, the adhesive film is disposed at the joint between two adjacent side surfaces of the battery cell to bond the first electrode plate, the separator and the second electrode plate, which can effectively reduce the impact of the battery cell on the encapsulation film encapsulating the battery cell, and further reduce the risk of a damage to the encapsulation film. At the same time, the structural stability of the battery cell can also be improved and the separator is prevented from turning over during subsequent use, thereby reducing the risk of short circuit of the battery cell, and further improving the safety of the battery cell.

| Illustration of reference signs of main elements | |
|---|---|
| battery cell | 100 |
| first electrode plate | 10 |
| separator | 30 |
| second electrode plate | 50 |
| first side surface | 101 |
| second side surface | 102 |
| first connection region | 101a |
| adhesive film | 60 |
| first edge | 11, 51 |
| second edge | 12, 52 |
| first connection position | 11a, 51a |
| chamfered angle | 111, 511 |
| first rounded angle | 113, 513 |
| second rounded angle | 115, 515 |
| third side surface | 103 |
| fourth side surface | 104 |
| second connection region | 103a |
| third edge | 13, 53 |
| fourth edge | 14, 54 |
| second connection position | 13a, 53a |
| fifth side surface | 105 |
| sixth side surface | 106 |
| seventh side surface | 107 |
| first surface | 100A |
| second surface | 100B |

The following specific embodiments will further explain the present application in combination with the above accompanying drawings.

DETAILED DESCRIPTION

The technical solutions in the embodiments of the present application will be clearly and completely described below in combination with the accompanying drawings in the embodiments of the present application. It is obvious that the described embodiments are only part but not all of the embodiments of the present application. All other embodiments obtained by those of ordinary skilled in the art without creative efforts based on the embodiments in the present application are within the protection scope of the present application.

Unless otherwise defined, all technical and scientific terms used herein have the same meaning as generally understood by those skilled in the art to which the present application pertains. The terms used in the description of the present application herein are merely for the purpose of describing the particular embodiments, and are not intended to limit the present application.

Some embodiments of the present application will be described in detail below in combination with the accompanying drawings. The embodiments described below and features in the embodiments may be combined with each other without conflict.

Figure 1:
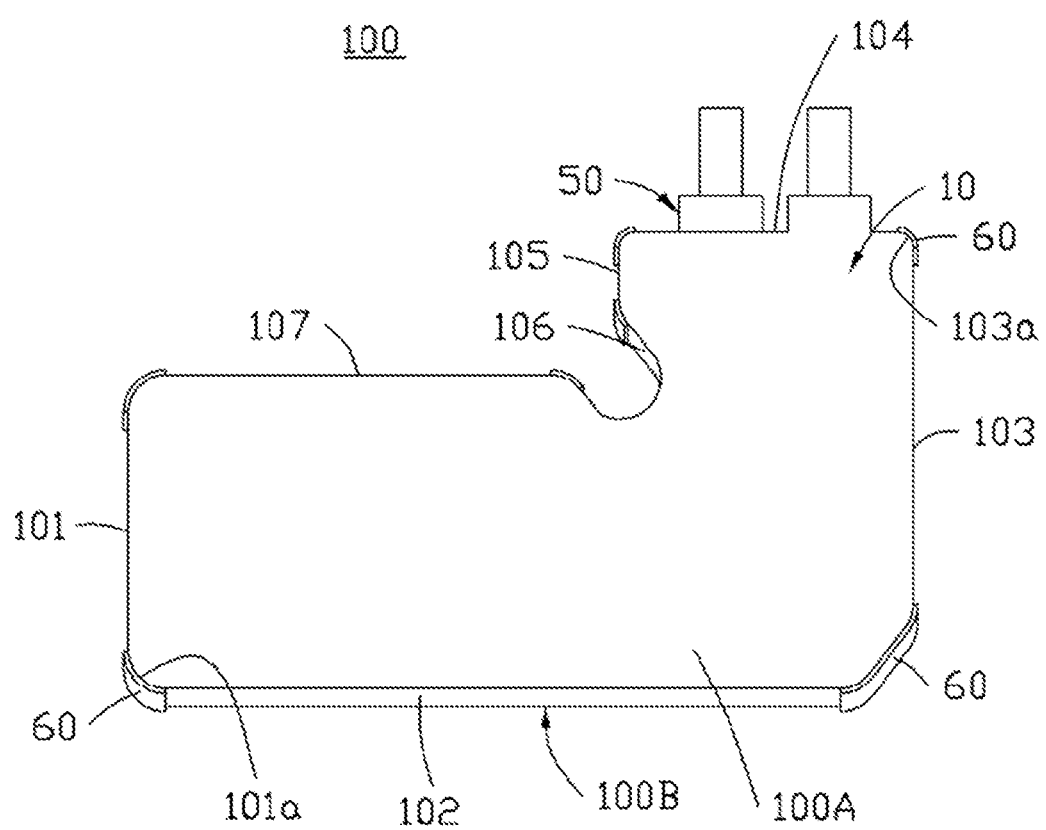
FIG. 1 is a schematic structural diagram of a battery cell according to an embodiment of the present application.
Figure 2:
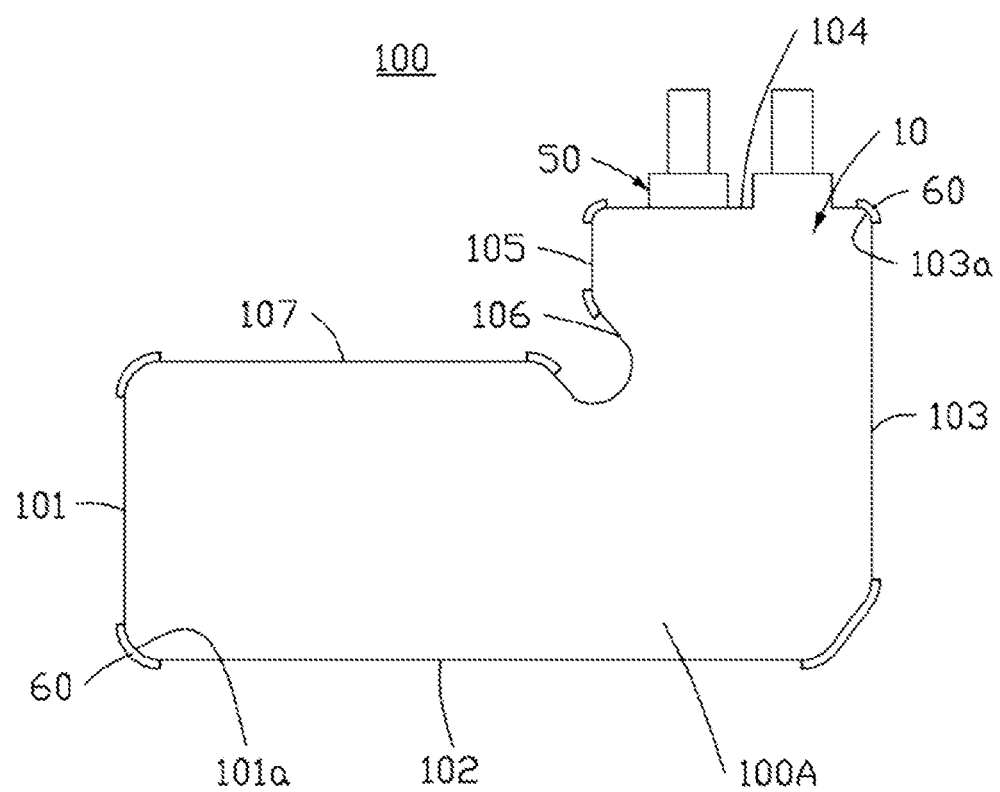
FIG. 2 is a schematic structural diagram of a battery cell according to an embodiment of the present application.
Figure 3:
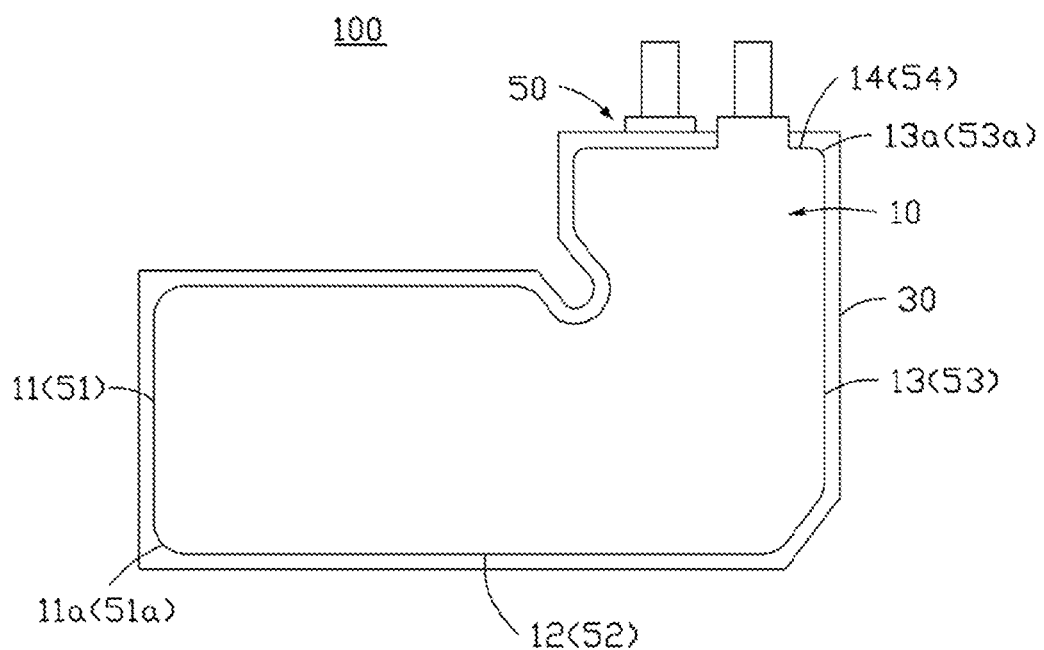
FIG. 3 is a partial schematic diagram of a battery cell according to an embodiment of the present application.

Referring to FIG. 1 to FIG. 3, according to an embodiment of the present application, the battery cell 100 includes a first electrode plate 10, an separator 30 and a second electrode plate 50 which are sequentially stacked along a first direction. The battery cell 100 further includes a first side surface 101 and a second side surface 102 which are extending along the first direction and are adjacent to each other, and the first side surface 101 and the second side surface 102 are connected by a first connection region 101a. The battery cell 100 further includes an adhesive film 60, and the adhesive film 60 is disposed in the first connection region 101a and is used for bonding the first electrode plate 10, the separator 30 and the second electrode plate 50 which are stacked along the first direction, so that the impact of the battery cell 100 on an encapsulation film encapsulating the battery cell in the case of an external force is reduced, the risk of a damage to the encapsulation film is reduced, meanwhile, structural stability of the battery cell can also be improved, and the separator is prevented from turning over during subsequent use, thereby reducing the risk of short circuit of the battery cell. In addition, when the encapsulation film encapsulates the battery cell, it is easy to form a redundant space corresponding to the connection region, and the adhesive film 60 disposed in the connection region can effectively utilize the redundant space to further improve the subsequent situation that an encapsulation structure of the battery cell is prone to collapse in the connection region, and at the same time, the risk that the infiltration of electrolyte is affected due to large-area gluing of the battery cell is also reduced.

The adhesive film 60 may be an adhesive layer or an adhesive tape. The adhesive tape includes a base material layer, and an adhesive layer which is disposed on the base material layer, and may be, for example, but not limited to, a single-sided adhesive tape or green adhesive, etc.

Preferably, along a second direction perpendicular to a tangential direction of the first connection region 101a, the thickness of a thickest part of the adhesive film 60 is 20 microns to 100 microns.

The first electrode plate 10 includes a first edge 11, a second edge 12 and a first connection position 11a, the first edge 11 and the second edge 12 are disposed adjacent to each other, and the first connection position 11a is connected to the first edge 11 and the second edge 12.

The second electrode plate 50 includes a first edge 51, a second edge 52 and a first connection position 51a, the first edge 51 and the second edge 52 are disposed adjacent to each other, and the first connection position 51a is connected to the first edge 51 and the second edge 52.

When the first electrode plate 10, the separator 30 and the second electrode plate 50 are stacked along the first direction, the first edges 11 and 51 and the separator 30 sandwiched between the first edges 11 and 51 form the first side surface 101 together, the second edges 12 and 52 and the separator 30 sandwiched between the first edges 11 and 51 form the second side surface 102 together, and the first connection positions 11a and 51a and the separator 30 sandwiched between the first connection positions 11a and 51a form the first connection region 101a together. The adhesive film 60 is used for bonding the first connection positions 11a and 51a and the separator 30 sandwiched between the first connection positions 11a and 51a.

Each first connection position 11a or 51a may include a right angle, a chamfered angle or a rounded angle. Preferably, the first connection positions 11a and 51a include the chamfered angles or rounded angles, so as to further reduce the risk of the damage to the encapsulation film after the battery cell is encapsulated by the encapsulation film, and at the same time, the adhesive film 60 is disposed corresponding to the chamfered angles or rounded angles, which is beneficial to improve the energy density of the battery cell. In the present embodiment, the first connection positions 11a and 51a are rounded angles.

Figure 4:
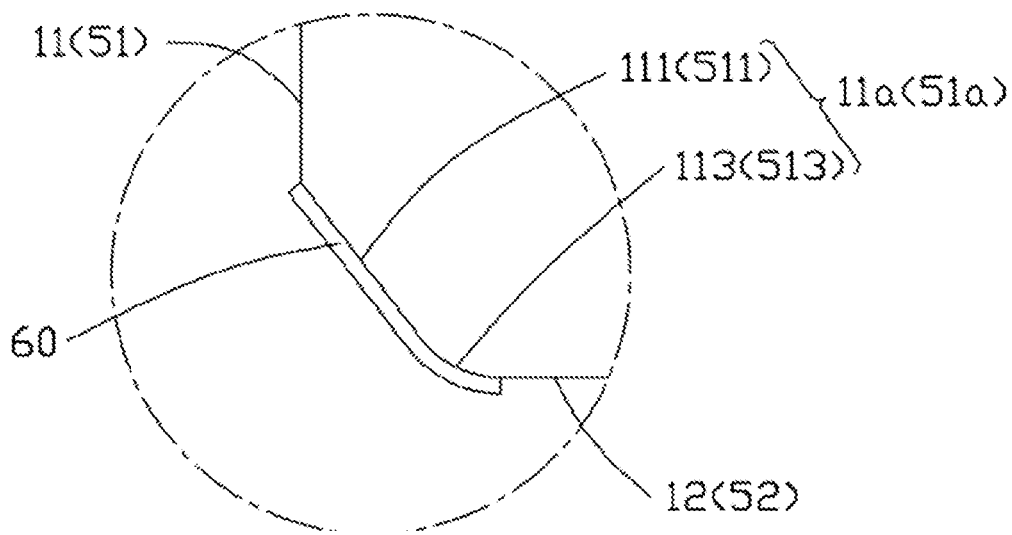
FIG. 4 is a partially enlarged schematic diagram of a battery cell according to an embodiment of the present application.

In some embodiments, please refer to FIG. 4, the first connection position 11a may include a chamfered angle 111 and a first rounded angle 113 connected to the chamfered angle 111, and the first connection position 51a may include a chamfered angle 511 and a first rounded angle 513 connected to the chamfered angle 511. The end of the chamfered angle 111 deviated from the first rounded angle 113 is connected to the first edge 11, and the end of the first rounded angle 113 deviated from the chamfered angle 111 is connected to the second edge 12; the end of the chamfered angle 511 deviated from the first rounded angle 513 is connected to the first edge 51, and the end of the first rounded angle 513 deviated from the chamfered angle 511 is connected to the second edge 52.

Figure 5:
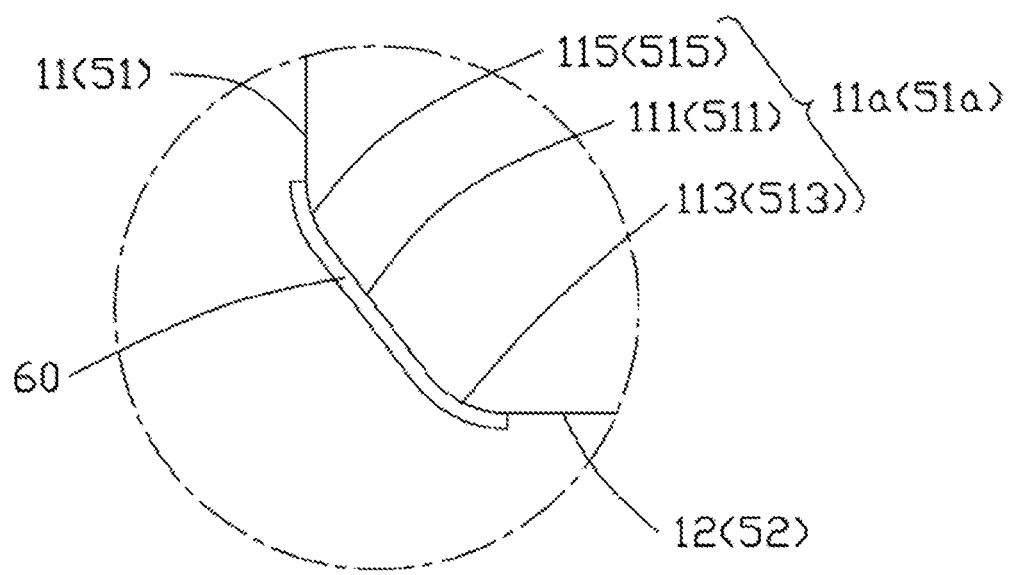
FIG. 5 is a partially enlarged schematic diagram of a battery cell according to an embodiment of the present application.

In some embodiments, please refer to FIG. 5, the first connection positions 11a and 51a may further include second rounded angles 115 and 515 respectively. The second rounded angle 115 is connected to the end of the chamfered angle 111 deviated from the first rounded angle 113 and the first edge 11, and the second rounded angle 515 is connected to the end of the chamfered angle 511 deviated from the first rounded angle 513 and the first edge 51.

A size of the second rounded angle 115 may be the same as or different from a size of the first rounded angle 113, and a size of the second element 515 may be the same as or different from a size of the first rounded angle 513.

Figure 6:
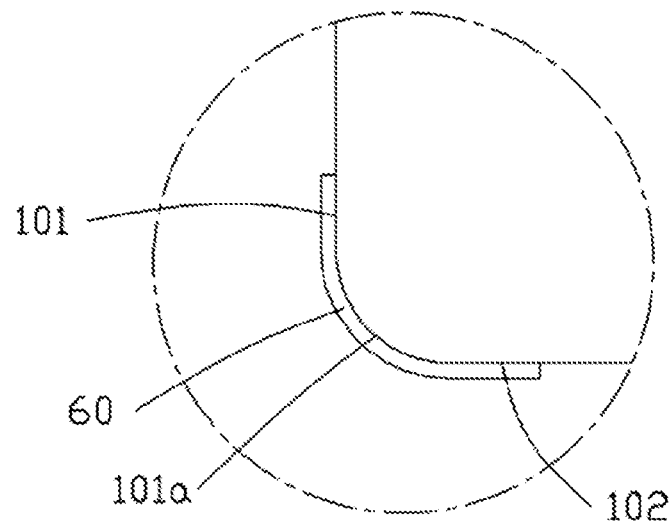
FIG. 6 is a schematic structural diagram of a battery cell according to an embodiment of the present application.

In some embodiments, please refer to FIG. 6, the adhesive film 60 may also extend from the first connection region 101a to the first side surface 101 or/and the second side surface 102, which is beneficial to improve bonding stability of the adhesive film 60, thereby improving the safety of the battery cell. Preferably, the adhesive film 60 extends from the first connection region 101a to the first side surface 101 or the second side surface 102 with a width less than or equal to 5 mm.

Preferably, the adhesive film 60 has viscosity at a temperature from normal temperature to 75° C.

The battery cell 100 further includes a third side surface 103 and a fourth side surface 104 which are extending along the first direction and are adjacent to each other, and the third side surface 103 and the fourth side surface 104 are connected by a second connection region 103a. The adhesive film 60 may also be disposed in the second connection region 103a to bond the first electrode plate 10, the separator 30 and the second electrode plate 50 which are stacked along the first direction. Therefore, the impact of the battery cell on the encapsulation film encapsulating the battery cell is further reduced, the stability of the battery cell is improved, the risk of short circuit of the battery cell is reduced, and the safety of the battery cell is further improved.

The first electrode plate 10 further includes a third edge 13, a fourth edge 14 and a second connection position 13a, the third edge 13 and the fourth edge 14 are disposed adjacent to each other, and the second connection position 13a is connected to the third edge 13 and the fourth edge 14.

The second electrode plate 50 further includes a third edge 53, a fourth edge 54 and a second connection position 53a, the third edge 53 and the fourth edge 54 are disposed adjacent to each other, and the second connection position 53a is connected to the third edge 53 and the fourth edge 54.

When the first electrode plate 10, the separator 30 and the second electrode plate 50 are stacked along the first direction, the third edges 13 and 53 and the separator 30 sandwiched between the third edges 13 and 53 form the third side surface 103 together, the fourth edges 14 and 54 and the separator 30 sandwiched between the fourth edges 14 and 54 form the fourth side surface 104 together, and the second connection positions 13a and 53a and the separator 30 sandwiched between the second connection positions 13a and 53a form the second connection region 103a together. The adhesive film 60 disposed in the second connection region 103a is used for bonding the second connection positions 13a and 53a and the separator 30 sandwiched between the second connection positions 13a and 53a.

Each second connection position 13a or 53a may include a right angle, a chamfered angle or a rounded angle. Preferably, each of the second connection positions 13a and 53a includes a chamfered angle or a rounded angle. In the present embodiment, the second connection positions 13a and 53a are both rounded angles.

In some embodiments, the second connection positions 13a and 53a may also include a combination of the chamfered angle and rounded angle like the first connection position 11a or 51a. Shapes and sizes of the second connection positions 13a and 53a may be the same as or different from shapes and sizes of the first connection positions 11a and 51a.

In some embodiments, the adhesive film 60 may also extend from the second connection region 103a to the third side surface 103 or/and the fourth side surface 104. Preferably, the adhesive film 60 extends from the second connection region 103a to the third side surface 103 or the fourth side surface 104 with a width less than or equal to 5 mm.

The present application mainly takes an L-shaped battery cell as an example. As shown in FIG. 2, the battery cell 100 further includes a fifth side surface 105, a sixth side surface 106 and a seventh side surface 107. The first side surface 101, the second side surface 102, the third side surface 103, the fourth side surface 104, the fifth side surface 105, the sixth side surface 106 and the seventh side surface 107 are sequentially disposed adjacent to each other and are connected to define an L shape, wherein the sixth side surface 106 is a concave arc-shaped surface as the inner side corner of the L-shaped battery cell. The second side surface 102 and the third side surface 103, the fourth side surface 104 and the fifth side surface 105, the fifth side surface 105 and the sixth side surface 106, the sixth side surface 106 and the seventh side surface 107, and the seventh side surface 107 and the first side surface 101 are respectively connected by one connection region (not shown).

The adhesive film 60 may also be disposed on the abovementioned connection regions to bond the first electrode plate 10, the separator 30 and the second electrode plate 50.

Preferably, by corresponding to each connection region, each of the edge of the first electrode plate 10 and the edge of the second electrode plate 50 may include a chamfered angle, a rounded angle or a combination of the two.

Figure 7:
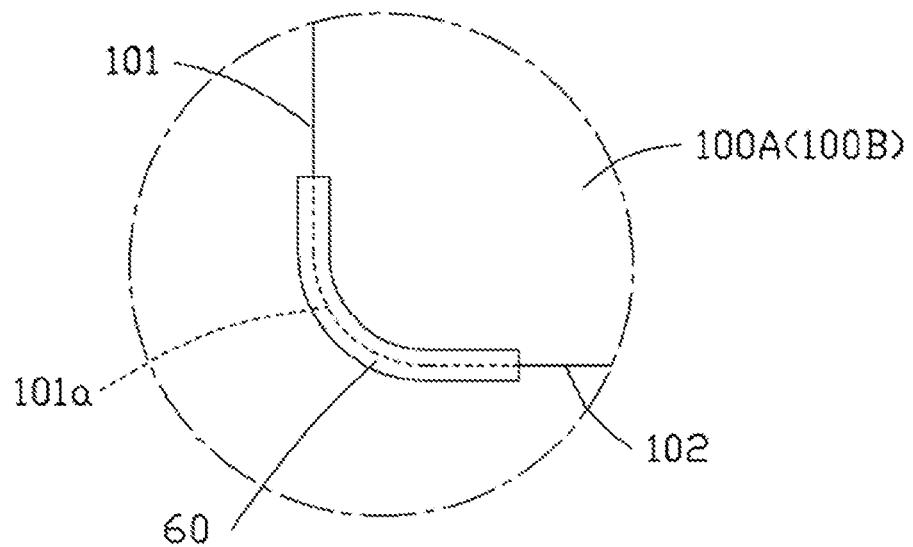
FIG. 7 is a schematic structural diagram of a battery cell according to an embodiment of the present application.

The battery cell 100 further includes a first surface 100A and a second surface 100B which are perpendicular to the first direction and are disposed opposite to each other. Please refer to FIG. 7, the adhesive film 60 may also extend from the first connection region 101a, the second connection region 103a or/and other connection regions to the first surface 100A or/and the second surface 100B, which is beneficial to further improve the bonding stability of the adhesive film 60, thereby improving the safety of the battery cell. Preferably, the adhesive film 60 extends from the first connection region 101*a*, the second connection region 103*a* or other connection regions to the first surface 100A or the second surface 100B with a width less than or equal to 2 mm.

Figure 8:
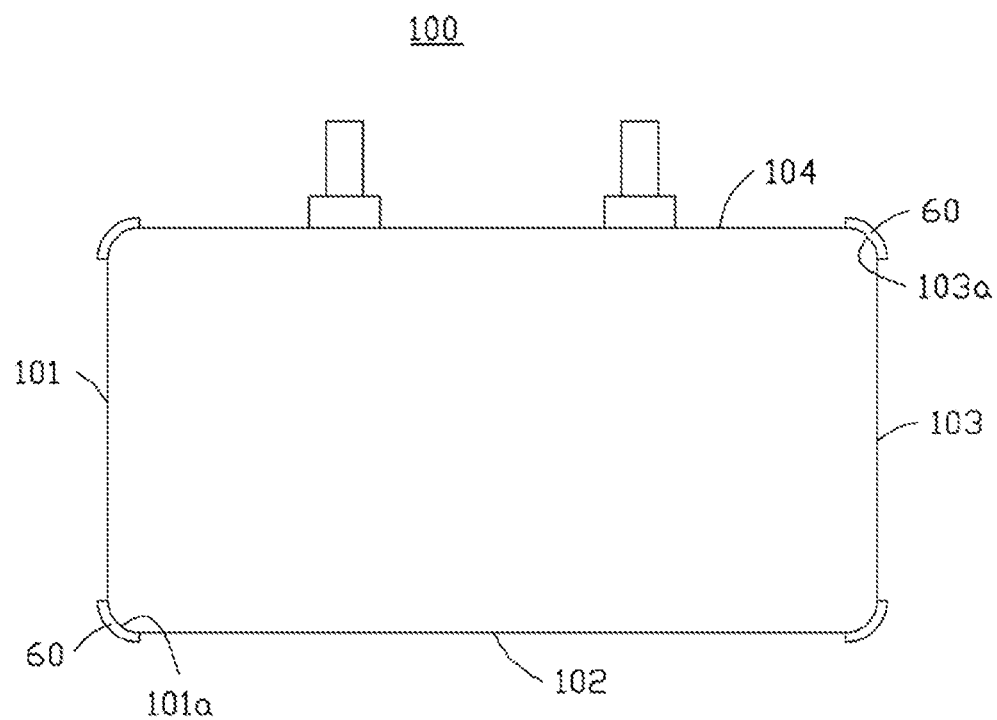
FIG. 8 is a schematic structural diagram of a battery cell according to an embodiment of the present application.

Although the present application mainly takes the L-shaped battery cell as an example, the design solution of the battery cell in the present application is not limited to the L-shaped battery cell, and may also be the battery cells of other shapes, such as a rectangular battery cell (as shown in FIG. 8) and a polygonal battery cell.

The abovementioned battery cell 100 is applied to an electrochemical device (not shown in the figure), and the electrochemical device may be, but not limited to, a battery.

According to the battery cell and the electrochemical device applying the battery cell of the present application, the adhesive film is disposed at the joint between two adjacent side surfaces of the battery cell to bond the first electrode plate, the separator and the second electrode plate, which can effectively reduce the impact of the battery cell on the encapsulation film encapsulating the battery cell, thereby reducing the risk of a damage to the encapsulation film. At the same time, the structural stability of the battery cell can also be improved and the separator is prevented from turning over during subsequent use, thereby reducing the risk of short circuit of the battery cell, and further improving the safety of the battery cell.

In addition, for those of ordinary skill in the art, various other corresponding alterations and transformations can be made according to technical concepts of the present application, and all these alterations and transformations should belong to the protection scope of the present application.

What is claimed is:

1. A battery cell, comprising: a first electrode plate, a separator and a second electrode plate, wherein the first electrode plate, the separator and the second electrode plate are stacked in sequence along a first direction;
    the battery cell further comprises a first side surface and a second side surface, wherein the first side surface and the second side surface extending along the first direction are adjacent to each other, and the first side surface and the second side surface are connected by a first connection region;
    wherein the battery cell further comprises an adhesive film, and the adhesive film is disposed in the first connection region, and is configured for bonding the first electrode plate, the separator and the second electrode plate; and
    wherein each of the first electrode plate and the second electrode plate comprises a first edge corresponding to the first side surface, a second edge corresponding to the second side surface, and a first connection position corresponding to the first connection region; wherein each first connection position comprises a chamfered angle or a rounded angle, so that the first connection region correspondingly forms a chamfered angle region or a rounded angle region; and the adhesive film is disposed in the chamfered angle region or the rounded angle region to bond the first electrode plate, the separator and the second electrode plate.

2. The battery cell according to claim 1, wherein each first connection position comprises a chamfered angle and a first rounded angle connected to the chamfered angle, a first end of the chamfered angle deviated from the first rounded angle is connected to the first edge, and a second end of the first rounded angle deviated from the chamfered angle is connected to the second edge.

3. The battery cell according to claim 2, wherein the first connection position further comprises a second rounded angle, and the second rounded angle is connected to one end of the chamfered angle deviated from the first rounded angle and the first edge.

4. The battery cell according to claim 3, wherein a size of the first rounded angle is the same as or different from a size of the second rounded angle.

5. The battery cell according to claim 1, wherein the battery cell further comprises a third side surface and a fourth side surface, the third side surface and the fourth side surface are disposed along the first direction and are adjacent to each other; wherein the third side surface and the fourth side surface are connected by a second connection region; each of the first electrode plate and the second electrode plate comprises a third edge corresponding to the third side surface, a fourth edge corresponding to the fourth side surface, and a second connection position corresponding to the second connection region; wherein each second connection position comprises a chamfered angle or a rounded angle, and the adhesive film is also disposed in a chamfered angle region or a rounded angle region formed in the second connection region corresponding to the second connection position to bond the first electrode plate, the separator and the second electrode plate.

6. The battery cell according to claim 1, wherein along a second direction perpendicular to a tangential direction of the first connection region, a thickness of a thickest part of the adhesive film is 20 microns to 100 microns.

7. The battery cell according to claim 1, wherein the adhesive film further extends from the first connection region to the first side surface or the second side surface, and the adhesive film extends from the first connection region to the first side surface or the second side surface with a width less than or equal to 5 mm.

8. The battery cell according to claim 1, wherein the battery cell further comprises a first surface and a second surface, the first surface and the second surface are perpendicular to the first direction and opposite to each other, the adhesive film also extends from the first connection region to the first surface or the second surface, and the adhesive film extends from the first connection region to the first surface or the second surface with a width less than or equal to 2 mm.

9. The battery cell according to claim 1, wherein the adhesive film has viscosity at a temperature from normal temperature to 75° C.

10. An electrochemical device, comprising a housing, wherein the electrochemical device further comprises the battery cell according to claim 1, the battery cell being disposed in the housing.

11. The electrochemical device according to claim 10, wherein each first connection position comprises a chamfered angle and a first rounded angle connected to the chamfered angle, a first end of the chamfered angle deviated from the first rounded angle is connected to the first edge, and a second end of the first rounded angle deviated from the chamfered angle is connected to the second edge.

12. The electrochemical device according to claim 11, wherein the first connection position further comprises a second rounded angle, and the second rounded angle is connected to one end of the chamfered angle deviated from the first rounded angle and the first edge.

13. The electrochemical device according to claim 12, wherein a size of the first rounded angle is the same as or different from a size of the second rounded angle.

14. The electrochemical device according to claim 10, wherein the battery cell further comprises a third side surface and a fourth side surface, the third side surface and the fourth side surface are disposed along the first direction and are adjacent to each other; wherein the third side surface and the fourth side surface are connected by a second connection region, each of the first electrode plate and the second electrode plate comprises a third edge corresponding to the third side surface, a fourth edge corresponding to the fourth side surface, and a second connection position corresponding to the second connection region, wherein each second connection position comprises a chamfered angle or a rounded angle, and the adhesive film is also disposed in a chamfered angle region or a rounded angle region formed in the second connection region corresponding to the second connection position to bond the first electrode plate, the separator and the second electrode plate.

15. The electrochemical device according to claim 10, wherein along a second direction perpendicular to a tangential direction of the first connection region, a thickness of a thickest part of the adhesive film is 20 microns to 100 microns.

16. The electrochemical device according to claim 10, wherein the adhesive film further extends from the first connection region to the first side surface or the second side surface, and the adhesive film extends from the first connection region to the first side surface or the second side surface with a width less than or equal to 5 mm.

17. The electrochemical device according to claim 10, wherein the battery cell further comprises a first surface and a second surface, the first surface and the second surface are perpendicular to the first direction and opposite to each other, the adhesive film also extends from the first connection region to the first surface or the second surface, and the adhesive film extends from the first connection region to the first surface or the second surface with a width less than or equal to 2 mm.

18. The electrochemical device according to claim 10, wherein the adhesive film has viscosity at a temperature from normal temperature to 75° C.

* * * * *